United States Patent [19]

Azzi

[11] 4,068,751
[45] Jan. 17, 1978

[54] GRAVITY FEED-RETURN PALLET STORAGE RACK

[75] Inventor: Victor D. Azzi, Durham, N.H.

[73] Assignee: The Kingston-Warren Corporation, Newfields, N.H.

[21] Appl. No.: 653,482

[22] Filed: Jan. 29, 1976

[51] Int. Cl.² .............................................. B65G 13/10
[52] U.S. Cl. ..................................... 193/36; 193/35 A
[58] Field of Search ............... 193/35 R, 35 A, 35 SS, 193/35 J, 35 G, 36, 39; 214/8.5 R, 8.5 C, 8.5 D, 8.5 K, DIG. 10; 221/289; 104/131; 254/10 R, 10 B, 10 C, 120; 198/592, 603

[56] References Cited

U.S. PATENT DOCUMENTS

| | | | |
|---|---|---|---|
| 1,112,543 | 10/1914 | Love | 214/DIG. 10 |
| 2,385,115 | 9/1945 | Stuart | 214/DIG. 10 |
| 3,057,448 | 10/1962 | Kornylak | 193/36 |
| 3,093,229 | 6/1963 | Scheidenhelm | 193/36 |
| 3,392,813 | 7/1968 | Trautmann | 193/36 |
| 3,532,201 | 10/1970 | McConnell | 193/35 A |
| 3,904,053 | 9/1975 | Yatagai et al. | 214/310 |

FOREIGN PATENT DOCUMENTS

| | | | |
|---|---|---|---|
| 1,382,511 | 11/1964 | France | 193/36 |
| 1,111,845 | 3/1956 | France | 254/10 C |
| 1,187,356 | 4/1970 | United Kingdom | 193/35 A |
| 831,541 | 3/1960 | United Kingdom | 254/10 C |

*Primary Examiner*—Evon C. Blunk
*Assistant Examiner*—James L. Rowland
*Attorney, Agent, or Firm*—Robert A. Townsend

[57] ABSTRACT

Rack or platform apparatus for receiving loaded pallets from the rear, forwarding them on one conveyor or trackway for order picking from the front, and then returning empty pallets on another conveyor or trackway for pickup from the rear.

27 Claims, 9 Drawing Figures

GRAVITY FEED-RETURN PALLET STORAGE RACK

BACKGROUND OF THE INVENTION

The invention relates to warehousing or material handling apparatus, and more particularly to apparatus for facilitating the order picking of goods or items, in carton or case lot quantities, from racked supplies and where the merchandise is sufficiently fast-moving for it to be efficient or economical to store or rack-deposit the items in pallet load quantities, but on the same supply line as from which the slower moving items are picked from either static shelving, or gravity shelving or flow racks.

The invention improves upon prior devices such as of U.S. Pat. Nos. 3,057,448, 3,093,229, and 3,392,813.

BRIEF SUMMARY OF INVENTION

A low profile, vertically compact pallet handling rack or platform having at the rear an upper, reserve pallet storing and forwarding conveyor or trackway, and a lower, empty pallet returning and storing conveyor or trackway. At the platform front an active pallet handling conveyor or trackway is shiftable, by movement both of translation and of rotation, between an upper position for receiving loaded pallets from the upper rear trackway, and a lower position for returning empty pallets to the lower rear trackway. The platform has a positive stop for reserve pallets on the upper rear trackway, and single lever control for both empty pallet discharge, and reserve pallet release. The combined translation-rotation movement is afforded the front or active trackway by four point supporting toggle linkages that are front-rear differentiated in their trackway raising-lowering, that are constrained against horizontal shifting of the trackway in said raising-lowering, and that are gravity or pallet load held in the upper or order picking position.

BRIEF DESCRIPTION OF THE DRAWINGS

In the accompanying drawings:

FIG. 6 is a section taken along the line 6—6 of FIG. 5a; and

FIG. 7 is a partial cutaway taken along the line 7—7 of FIG. 5a.

DESCRIPTION OF THE PREFERRED EMBODIMENT

Figure 1:
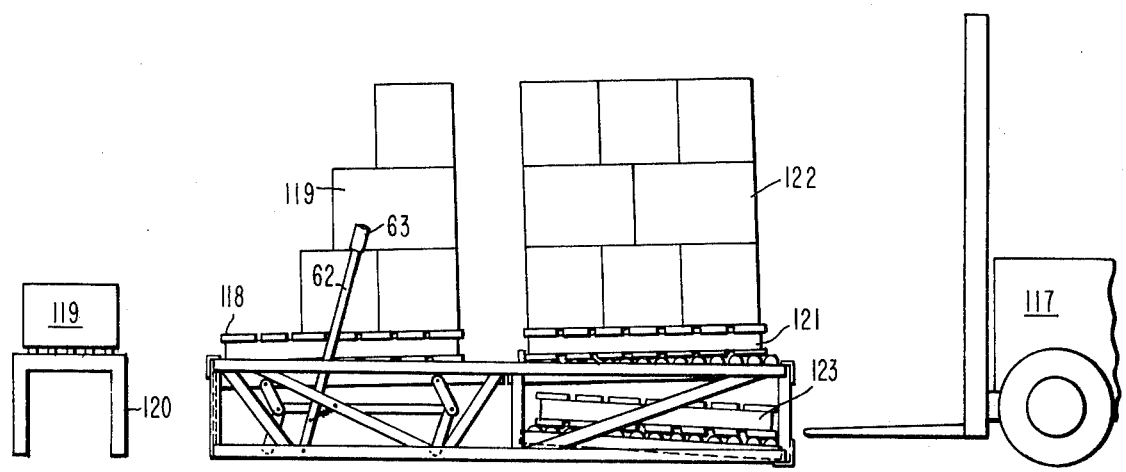
FIG. 1 is a side view of the platform, showing also conventional means by which merchandise is delivered to and conveyed from the platform.
Figure 2:
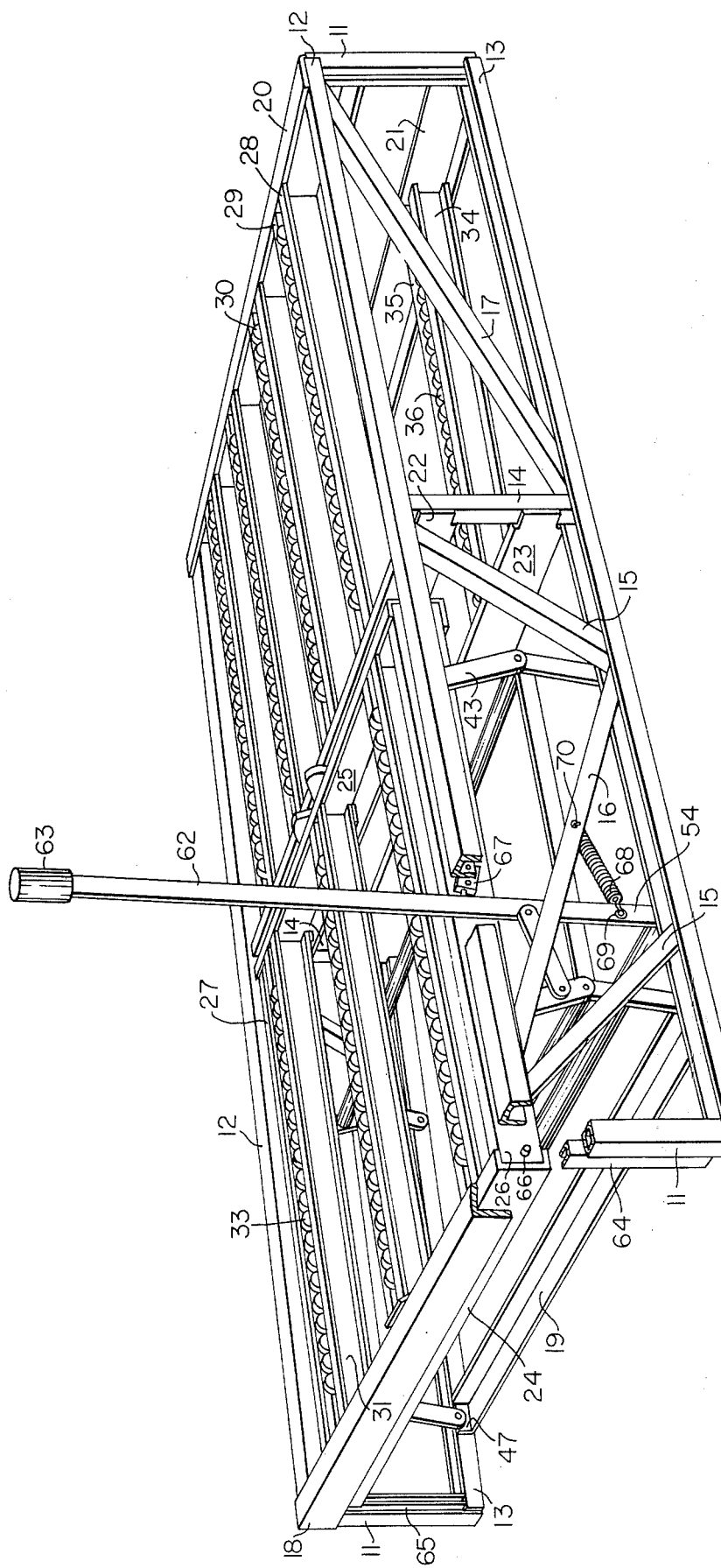
FIG. 2 is a perspective view of the platform, with the front or active pallet trackway in the upper or order picking position.
Figure 3:
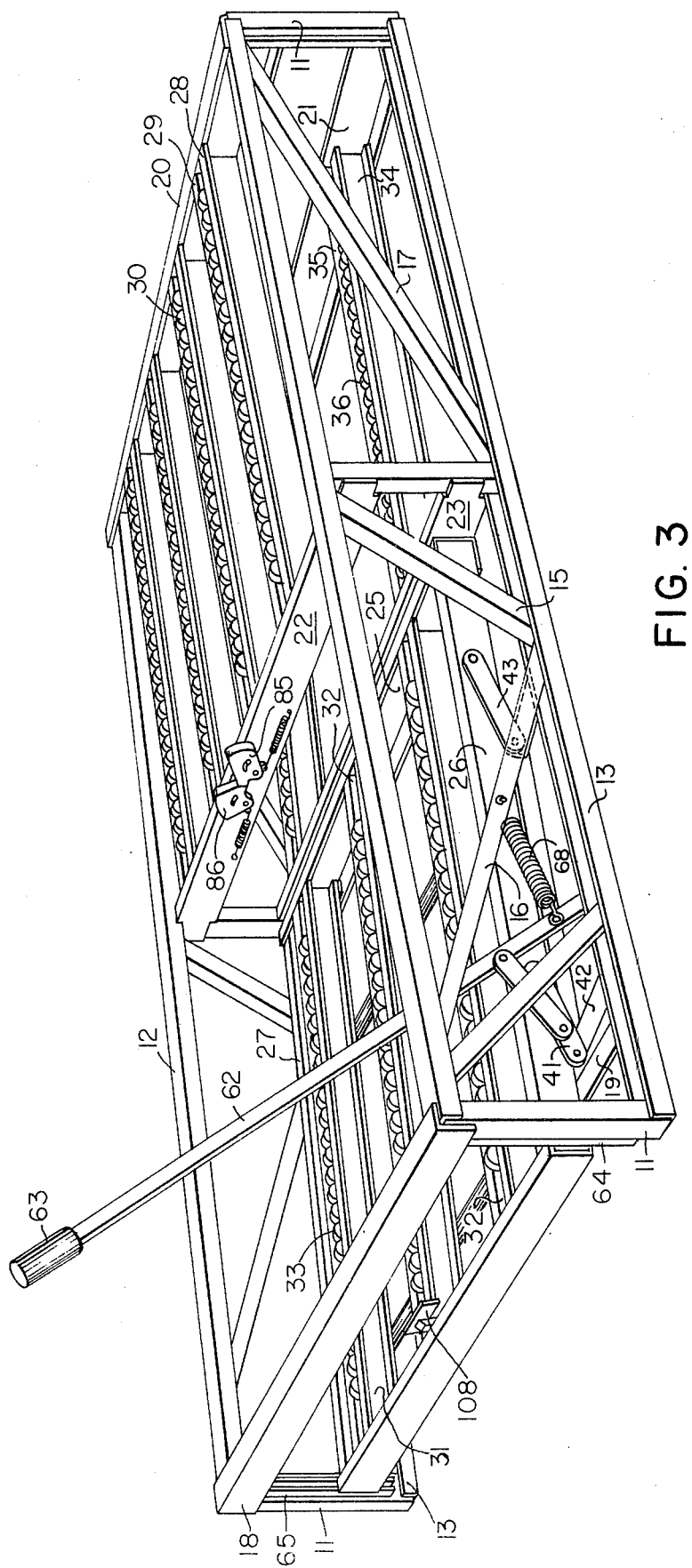
FIG. 3 is a like view of the platform with the front trackway in the lower or empty pallet returning position.

The invention rack or platform is shown generally in FIGS. 1—3 to have a low-profile or vertically compact frame comprising four vertical corner posts or columns 11 receiving thereover opposite, down-facing side rails or channels 12, and seated in turn in opposite, up-facing, bottom side rails or channels 13. Intermediate vertical posts 14, and short and long diagonal braces 15, 16 forwardly thereof, and long diagonal braces 17 rearwardly thereof, are received in channels 12, 13 similarly as are the posts 11, and secured to said channels or rails, or to the rails and each other, by welding or other means whereby they suitably support and stiffen the frame.

Transversely the frame comprises an upper front angle 18 received over the front ends of the rails 12; a lower front angle 19 inset from the front ends of and spanning between the bottom side rails 13; an upper, front facing rear channel 20 enclosing, by its top leg or ledge and its back or web, the upper rear posts 11-side rails 12 intersection; and lower rear angle 21 extending across the rear corner posts 11 and under the rear ends of bottom rails 13 as shown, FIG. 1.

At the rear, the platform has a reserve and empty pallet receiving and storing section further comprising upper, rear facing center channel 22 spanning between intermediate posts 14 and fixed thereto at a height calculatedly below that of upper rear channel 20; and lower, rear facing, center channel 23 fixed to the intermediate posts 14 at a height calculatedly above that of lower rear angle 21.

At its front the platform has, received within the described frame, an active pallet handling section, or shelf frame, comprising transverse, opposite facing, front and rear channels 24 and 25, a pair of infacing opposite side channels 26–27.

The rear pallet storing section further comprises an upper, reserve pallet receiving, storing and forwarding conveyor or trackway, herein formed by a suitable number and transverse spacing of pallet supporting and guiding flow, gravity or roller track assemblies comprising each a pair of flanged side members 28, 29 mounting therebetween, or having journalled therein, a succession of wheels 30 projecting sufficiently above the side members to cause pallets riding thereon to pass above or clear of said track side members.

The roller track side members 28, 29 are secured at their opposite ends to the bottom legs or ledges of the channels 20, 22, and extend upwardly therefrom such that their top flanges are flush with, or lie in substantially the same plane as, the top legs of the channels 20, 22, which latter are non-interferent with said side member top flanges by their being of substantially shorter or lesser horizontal extent than the track-seating bottom ledges of said rear and intermediate channels 20, 22.

The front shelf frame 24–27 is provided similarly with an active pallet forwarding and returning gravity conveyor or trackway formed by a like plurality and spacing of the described roller track assemblies, comprising each therein the side members 31, 32 and roller wheels 33.

The platform rear, reserve and empty pallet storing section comprises further a lower, empty pallet returning and storing conveyor or trackway comprising similarly the side members 34, 35 and wheels 36.

The mounting of channel 22 relatively lower than channel 20, and of channel 23 relatively higher than angle 21, is such that in the rear pallet storage section the upper, reserve pallet receiving, storing and forwarding trackway, or roller track 28-30, and the lower, empty pallet receiving returning and storing trackway, or roller track 34-36, have opposite slope angles, or forward and rearward attitudes or inclinations of, say 1¼°, or just sufficient to render them gravity flow track, i.e. to cause loaded and empty pallets to self-propel there along.

The upper, rear, reserve pallet storing and forwarding trackway has front end stop means to be described. The lower, rear, empty pallet returning and storing trackway has rear end stop means formed by the vertical side of the angle 21 projecting suitably above the height of the top flanges of the roller track sides 34, 35.

Under the invention, the platform frame is of such low profile, or so vertically compact, as to allow the passage of a pallet, such as shown at 123, FIG. 1, under the front end or center channel 22 of the upper rear trackway only if in alignment with, i.e. with neither pallet end tipped up from the plane of, the lower rear trackway. However, even with their described close vertical spacing, the slight forward and rearward inclinations respectively of said upper and lower rear trackways are such that their planes converge or intersect, as seen from FIG. 1, only outwardly of, or well forward of the front of, the platform.

Accordingly, platform-independent or shiftable means are provided for mounting the active pallet handling section, or shelf frame 24-27 and trackway 31-33, for combinational, herein simultaneous movement both of translation and of rotation, between an upper, reserve pallet receiving position occupying the same plane as, and having the same angle of forward inclination as, the upper, rear reserve pallet forwarding trackway 28-30, and a lower, empty pallet returning or discharging position occupying the same plane, as and having the same angle of rearward inclination as, the lower rear storage section or empty pallet receiving and storing trackway 34-36.

The shelf frame shifting or raising-lowering and rotating means comprise four point supporting, opposite side duplicated, front-rear differentiated toggles or toggles hingedly secured to the shelf frame and platform for folding or collapsing in both or opposite directions or modes from their straight up or fully extended position.

The front toggles 37, 38 comprise more particularly upper and lower links 41, 42, and the rear toggles are formed correspondingly with upper and lower links 43, 44.

All said upper toggle links are hingedly joined to the shelf frame sides 26, 27 as by pivot pins 45. All said lower toggle links are hingedly joined to the platform bottom side rails 13 as by pivot pins 46.

If desired, block bearings or journals 47, FIG. 2, may be separately provided for said pins 45, 46.

The front toggle links 41, 42 are intermediately joined at hinge pins 48, and transversely fixed by spacer tube 49 also secured at its ends to hinges 48.

The rear toggles 39, 40 likewise have their upper and lower links 43, 44 hingedly joined together by pivot pins 50, to which spacer tube 51 is also secured at its opposite ends.

To enable the shelf frame movement to be described, the opposite side toggles 37, 39 and 38, 40 are joined front to rear by integral links 52, 53 secured each to the intermediate, front and rear toggle hinge pins 48, 50, whereby at both sides the toggle centers move in tandem, being thus held at constant distances.

Means are provided for urging or forcing the toggles 37-40 past centers in both directions or modes of their folding or collapsing movement, comprising opposite side lever arms 54, 55 hinged as by pins 56 to bottom side rails 13 rearwardly of front toggles 37, 38. The levering means, or lever arms 54, 55, have push-pull connection with said front toggles 37, 38 through lever-toggle links 58, 59 pivotally joined or hinged to the toggle upper links 41 by pins 60, and likewise joined to the levers 54, 55 by pins 61.

Figure 4A:
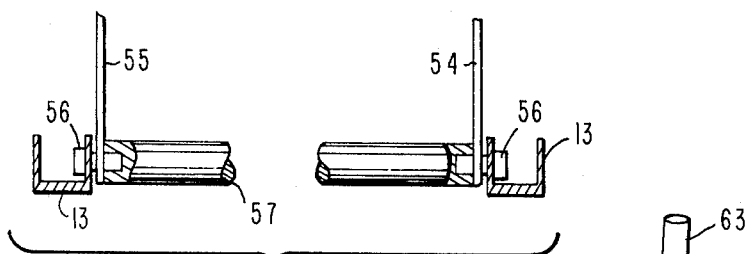
FIG. 4a is a fragmentary section along the line 4a—4a of FIG. 4, detailing the single lever control linkage.

The levers 54, 55 are manipulable by a single operating arm, such as herein the extension 62 of lever 54 which is provided with a grip 63, through their being rotationally joined, or rotatively rigid, through lever follower means or torque rod or tube 57, FIG. 4a, which is made rigid with the lever arms 54, 55 and with the pins 56 that are swivelling in the channel 13.

In the combinational movement raising and lowering of the shelf frame 24-27, as herein by the extending and collapsing of the toggles 37-40, the shelf frame has to be four point supported, and also to be constrained against horizontal and particularly front-rear shifting, as herein by vertical guide channels 64, 65, FIG. 2, mounted on the inside of front corner posts 11 and receiving the frame carried guide pins 66 projecting thereinto from the front shelf frame corners or sides 26, 27.

In accordance with the invention, the toggles 37-40 are front-rear differentiated, or the front toggles 37, 38 are made dissimilar to the rear toggles 39, 40, in respect of one or more of their determinants, such as the length of their links 41, 42 (front) and 43, 44 (rear), and the location of their fastenings 45, 46, 48 (front) and 45, 46, 50 (rear) relative to each other and lengthwise of the shelf frame sides 26, 27 and the bottom platform rails 13, whereby in the push-pull, opposite direction or mode, folding or collapsing thereof by the arm or handle 62 the shelf frame is subjected to movement both in translation and in rotation. That is, when the handle 62 is pulled by the operator, or order picker, so as to bring the shelf frame to its lowermost position of FIG. 3, the shelf frame has translation movement in guide channels 64, 65 downwardly to the extended plane of the lower rear trackway, and also rotation movement in that the shelf frame and its active pallet handling trackway are caused by said front-rear toggle differentiation to pivot or rotate to the same, rearward sloping, empty pallet returning attitude or inclination as has said lower rear trackway.

Figure 4:
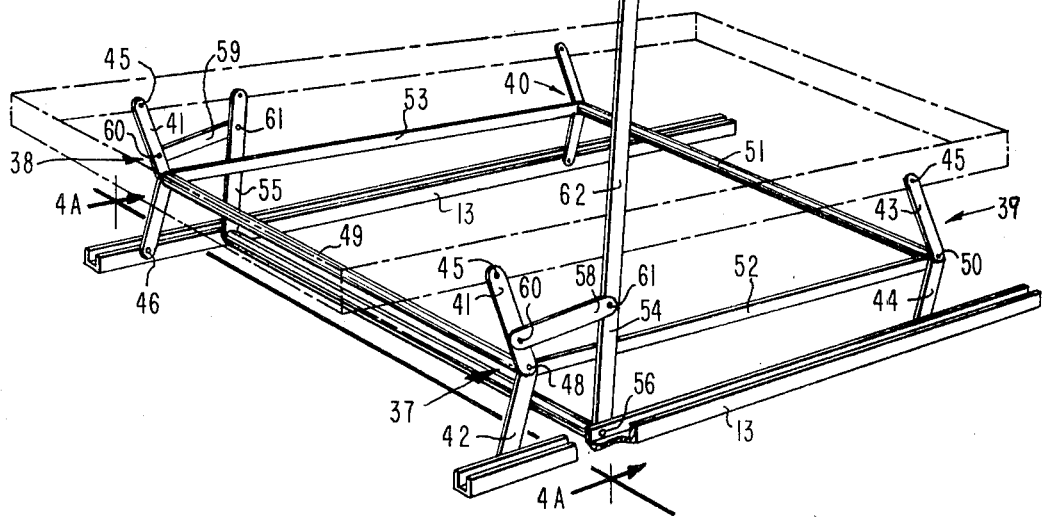
FIG. 4 shows the linkage and control lever for supporting and shifting the front or active pallet section or trackway.

Conversely, if the operating arm or handle 62 is pushed from the said lower, empty pallet returning position of FIG. 3 to the upper, full pallet receiving position of FIGS. 1, 2 and 4, the shelf frame is caused to have the combinational movement, of both translation and rotation, in the opposite direction, with the shelf frame moving upwardly in the guides 62-63, and also rotating oppositely past horizontal, to come to a pallet forwarding position of alignment with the upper rear trackway, and more particularly of occupying the same plane, extended, as said upper rear trackway, and being in the same forward sloping, reserve pallet forwarding attitude or inclination as has said upper rear trackway, FIG. 1.

It will be seen that to reach the FIGS. 1, 2 and 4 position the toggles are swung from their FIG. 3 position past centers, or through their straight up, most fully extended position, thus lowering the shelf frame slightly in their moving or from said straight up position to the partially collapsed position they occupy when supporting the front, active pallet handling section, shelf frame or trackway in the aforesaid upper, reserve or full pallet receiving position.

Means are provided by the invention for limiting the toggle collapse, in their swing in the rightward or push mode, from going past the aforesaid upper operating position, such as herein by the frame-mounted override stop 67 engaging and halting the operating arm 62 in said position.

The shelf frame 24-27, upon its said slight lowering or only partial collapse to the upper operating position, is held against inadvertent shifting therefrom by pallet load, and additionally by spring means, such as the coil spring 68, so connected to the lever arm and platform, as herein by lever arm and long brace 16 fastenings 69, 70, as also to assist the operator to overcome the shelf frame weight in pushing the handle 62 to return the shelf frame from the lower to the upper operating position.

Figure 5A:
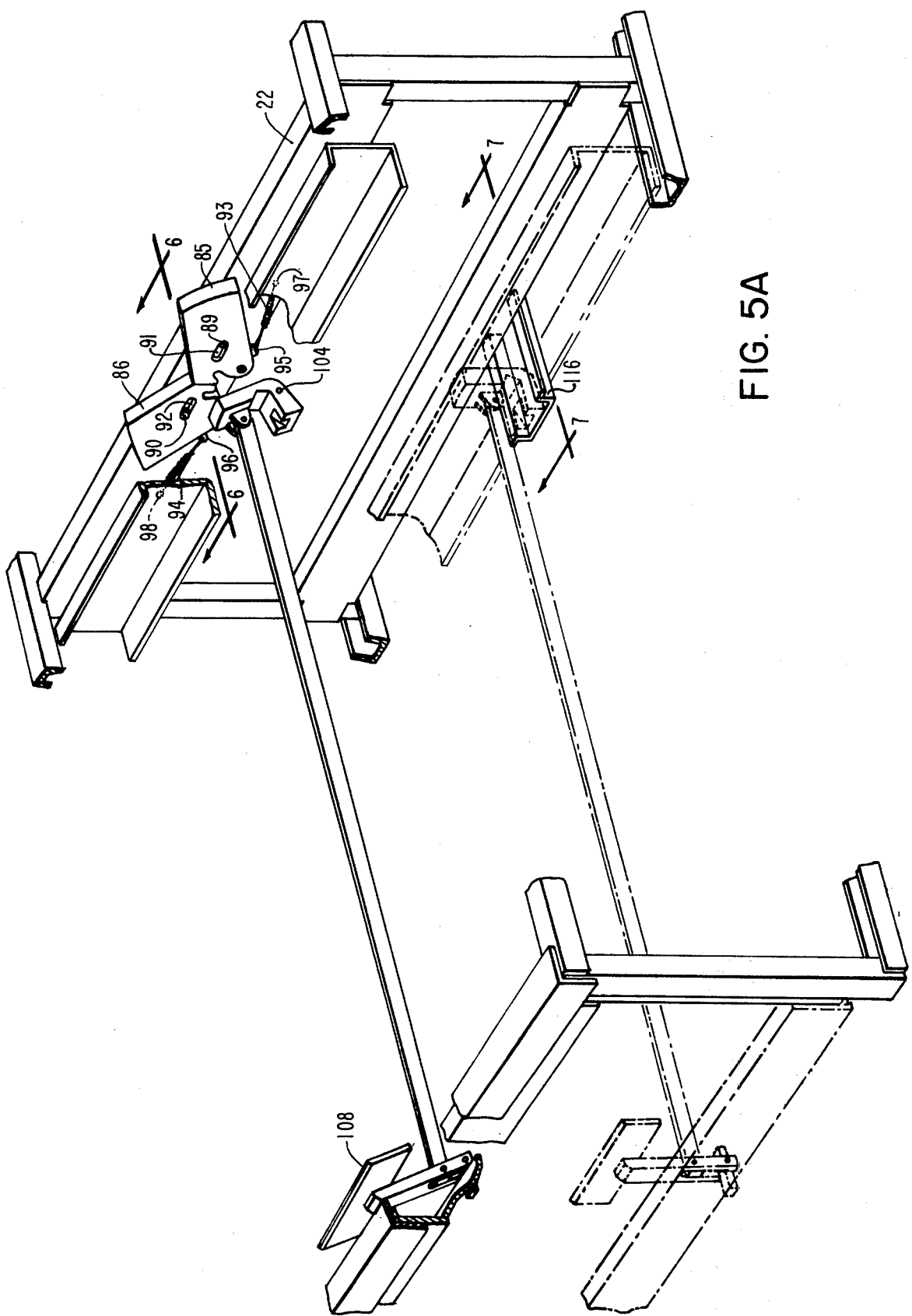
FIG. 5a shows the pallet stop means in the active position, and the pallet stop latch and latch trip means solid line in the upper stop release, and dash line in the lower latch reset, positions.
Figure 5B:
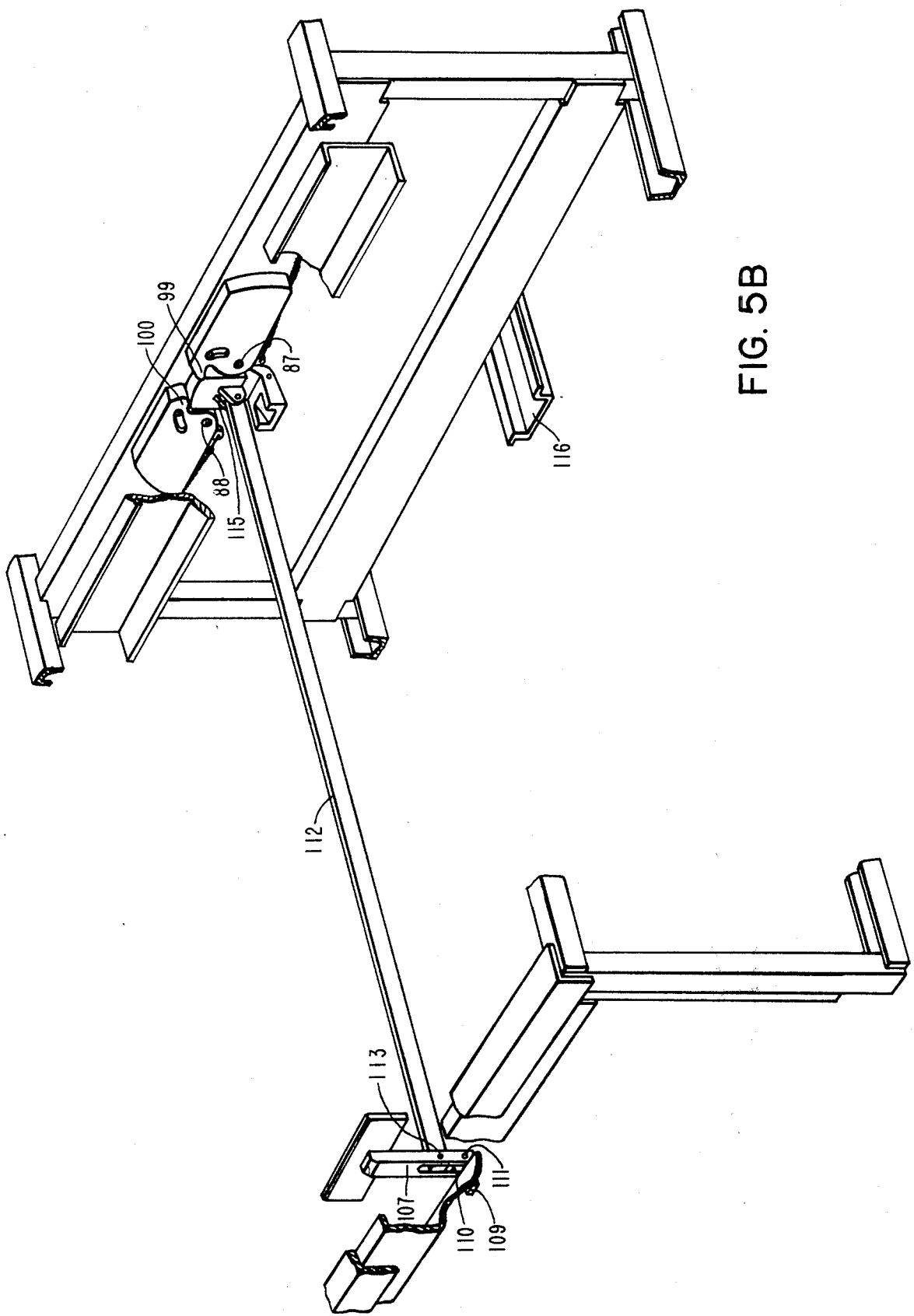
FIG. 5b shows the FIG. 5a means in the upper position but with the latch reset and the pallet stops deactivated thereby.

Means are provided for stopping or halting the self-propelled advance of pallets on the upper rear or reverse pallet trackway, at the front thereof, herein comprising a pair of like, normally active blocks or stops 85, 86 pivoted, as on bolts 87, 88 to the front side or face of upper center channel 22, and being restricted, in said pivoting, by bolts 89, 90 mounted on channel 22 to project into stop recesses 91, 92 of an angular extent permitting swinging of the pallet stops 85, 86 from the active position of FIGS. 1-3 and 5a, wherein they project upwardly of the channel 22 sufficiently to block or stop the pallets, FIG. 1, to the inactive or pallet release position of FIG. 5b, wherein they are brought down to extend horizontally below the level of the channel 22 top, and hence lie out of the way of the pallets.

The pallet stops 85, 86 are made normally active, or more particularly biased upwardly to their pallet stopping position, by spring means such as the coil springs 93, 94 stretched between stop lugs 95, 96 and suitable fastening 97, 98 on the channel 22.

Figure 6:
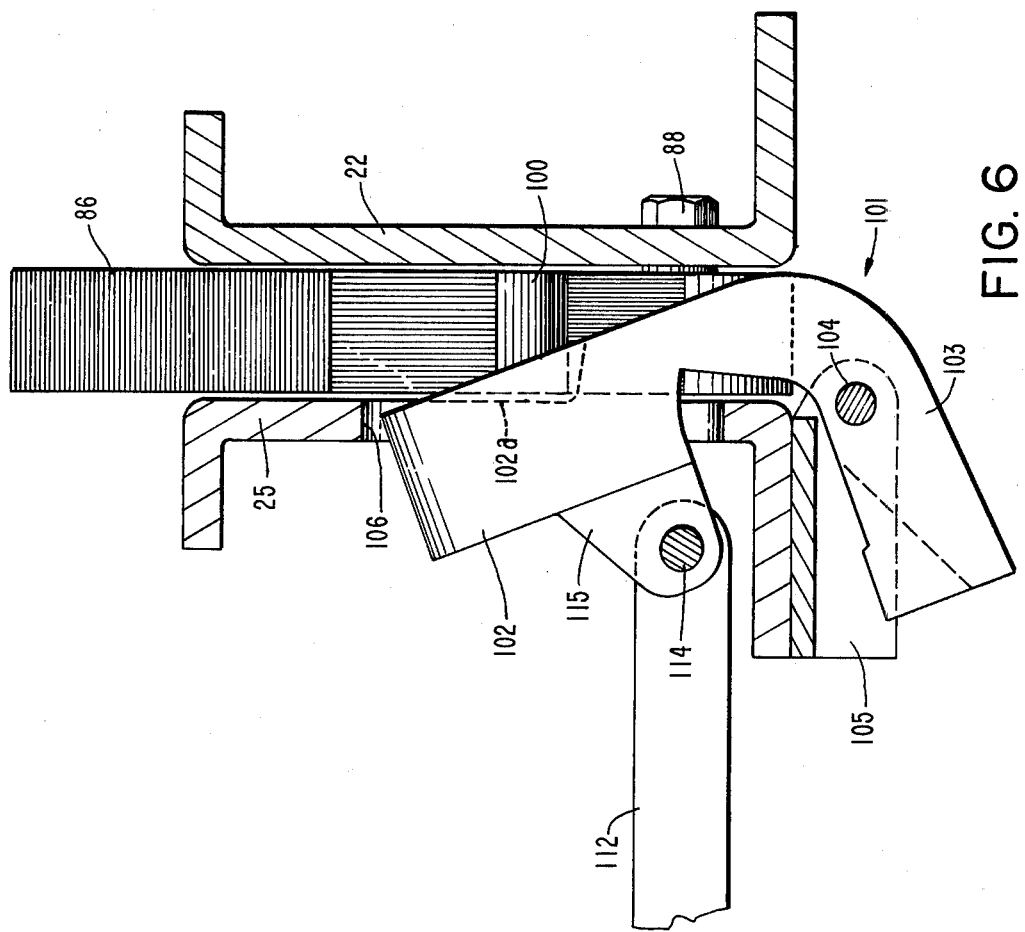

The pallet stops 85, 86 further comprise rounded noses 99, 100, FIGS. 5a, 5b and 6, which are capable of rolling on a bearing surface that is engaged thereagainst, and which also mate together when they are brought downwardly as the stops swing upwardly their upper, active position.

Figure 7:
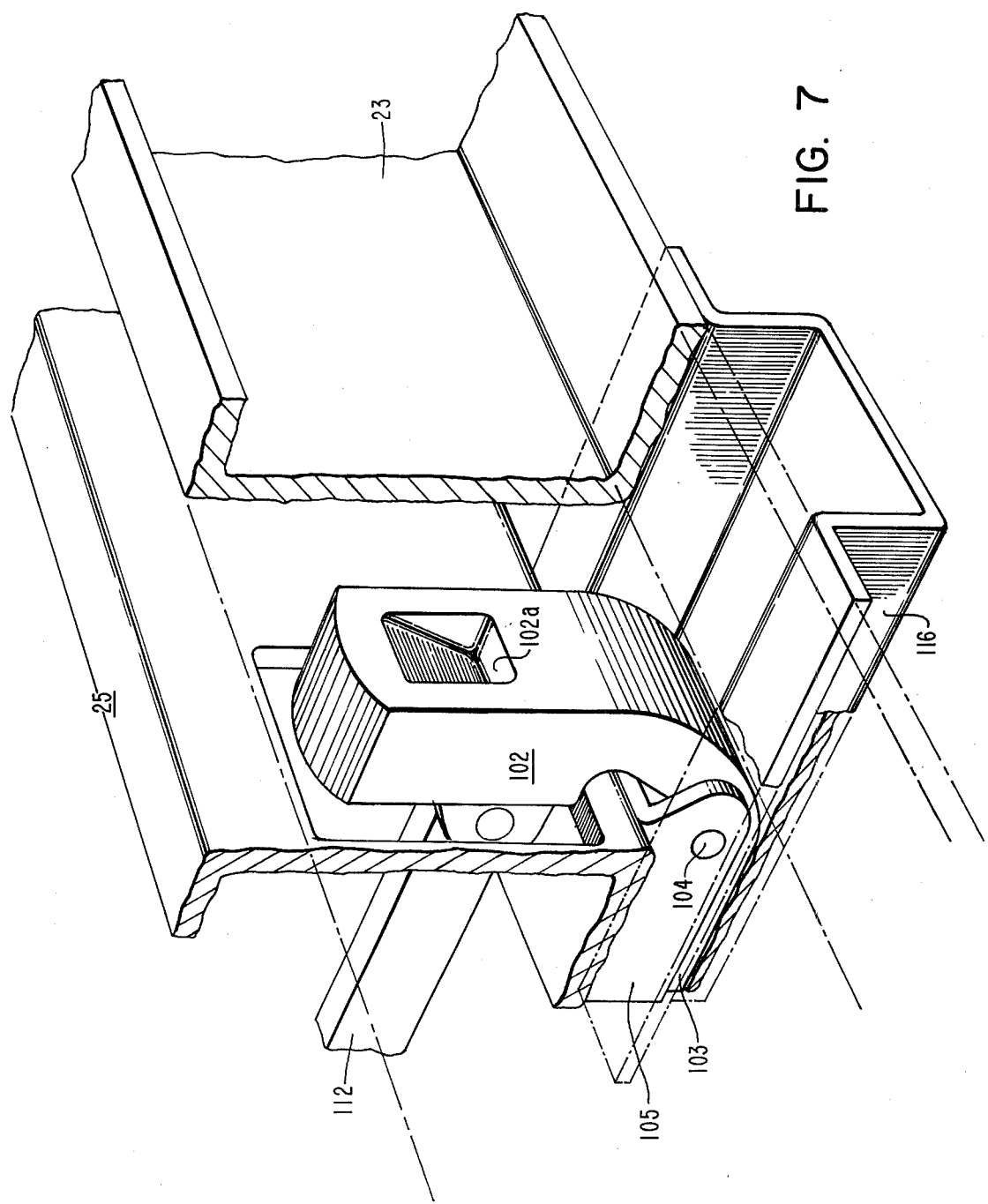

Means are provided for automatically lowering or de-activating the pallet stops when the active pallet trackway is brought to its upper, reserve pallet receiving position, comprising a latch 101 formed with an upper vertical arm 102 shaped to enter between and bear endwise against the stop noses 99, 100, and having a two-stop-nose fitting and sidewise receiving recess 102a, FIG. 7. The latch 101 further has a lower horizontal arm 103, and is pivoted, as on a bearing pin 104, in a shoe or inverted channel portion 105 through which the pin 104 is also passed, and which is secured to the underside of shelf frame rear channel 25, FIG. 6.

When the shelf frame and active pallet handling trackway are brought to the aforementioned upper position, for receiving a reserve pallet, the latch 101, in the upper-leg-vertical, stop de-activating position of FIGS. 5b and 7, engages the noses 99, 100 of pallet stops 85, 86 to overcome the normally-active biasing of springs 93, 94 to force the pallet blocking portions of the stops to swing downwardly from the FIG. 5a to the FIG. 5b position.

The shelf frame rear channel 25 has an opening 106 whereby the latch 101 is capable of swinging forwardly from the FIGS. 7 to the FIGS. 6 position, in which latter the pallet stops 85, 86 are released, or allowed to be re-activated by the springs 93, 94 which, in swinging or returning the pallet stops to their upper or active position cause the stop noses 99, 100 to depress into the latch recess 102a provided therefor, FIGS. 6 and 7.

Means are provided for tripping or pivoting forward the latch 101, to disengage and thereby re-activate the stops 85, 86, automatically upon the forwarding by the apparatus of a pallet to the front end of the shelf frame, or active pallet handling trackway, the said means herein comprising a latch trip bar 107 fixedly mounting a pallet engageable paddle 108, and being pivotally mounted in turn on a latch support bar 109 fixed to the underside of channel 24, and which extends rearwardly thereof into latch trip bar notch 110 and there receives pivot pin 111 passed also through the latch trip bar sides.

Latch trip bar 107 controls latch 101 through integral, shelf frame length, bar-latch line 112 pivoted at its front end on pin 113 in latch trip bar notch 110, and pivotally joined at its rear end to latch 101 by pivot pin 114 received through the link and anchored in link enclosing latch ears 115.

Means are provided for resetting the latch 101, or returning it from the FIG. 5a solid line to the FIG. 5a dash line and FIG. 5b position, automatically upon the moving of the shelf frame or active pallet handling trackway to the lower or empty pallet returning or discharging position. Said means herein comprise latch reset yoke or channel length 116, FIGS. 5a, 5b and 7, secured to the underside of lower center channel 23, and engaging bottom side 103 of latch 101, upon said shelf frame shifting to its lower position, to force said latch bottom side 103 upwardly from the FIG. 6 to the FIG. 7 position, wherein latch upper side or leg 102 is vertically positioned, FIG. 7, in the space or gap between the channels 23 and 25, and hence for engaging the stops 85, 86 in the gap, FIG. 6, between channel 25 and the upper center channel 22, upon the raising of the channel 25 to upper position juxtaposition thereof, and hence of the latch 101, to said upper center channel 22.

Means are provided for return or discharge thrusting of active trackway stored pallets that have become empty, automatically upon the lowering of the shelf frame to position therefor, of alignment as aforesaid with the lower rear empty pallet receiving and storing trackway, said means herein comprising the paddle 108 which is swung rearwardly by the described return shifting of the latch 101 through its seating in reset yoke 116, to press against and force or thrust rearwardly the empty pallet, and to thereby insure or initiate the otherwise self induced or gravity propelled flowing or discharging or returning of the empty pallet rearwardly on and from the active pallet trackway to reception on the lower rear, empty pallet storing trackway.

In the operation of the pallet handling apparatus, or platform, active pallets 118 on the front trackway have their cartons 119 removed by the order picker to a conveyor 120 extending in front of a row or rank of differently supplied such platforms, whereby the different combinations of items of the successive orders are variously made up or assembled.

When the front or active pallet handling section has received a previously reserve pallet, and the reserve pallet trackway is thereby vacated, the operator of the pallet supplying forklift 117, upon looking down the platform row from the rear, and readily spotting the opening, or absence of a pallet from the reserve trackway of a particular platform, deposits thereon a reserve pallet 121 with its full complement of cartons 122, and at the same time removes from the lower rear trackway the empty pallet 123 that was discharged from the active pallet handling trackway previous to the forwarding thereto of a full pallet 121.

When the picking of the cartons 119 from the active pallet 118 has been completed, and the pallet emptied, the operator merely pulls the handle 62, by the grip 63, to swing the toggles in the full collapsing mode to the FIG. 3 position, or to lower-rotate the shelf frame 24–27 and active pallet handling trackway 31–33 as aforesaid to the same lower plane as, and into rearward sloping alignment with, the lower rear trackway 34–36, whereby the empty pallet, pushed by paddle 108, flows or rides from the active trackway over lower channel 23, clearing under upper channel 22, onto empty pallet receiving and storing trackway 34–36, to be stored or held thereon by engaging lower rear angle 21 as beforementioned.

Latch 101 is thereupon reset, by its being thereby brought down against yoke 116, to the upright or pallet stop de-activating position of FIG. 7.

Accordingly, when the operator pushes the arm 62 to return the active pallet section to its upper, reserve pallet receiving position, the pallet stops 85, 86 are automatically de-activated as aforesaid by the latch 101, and the reserve pallet 122 is freed or released thereby to gravity flow to the front, or onto the active pallet handling trackway.

The now active pallet 118, in flowing all the way to the front of the active pallet handling trackway, forces paddle 108 forwardly down against the upper front angle 18 stop therefor, and thereby trips the latch 101 as aforesaid, or more particularly causes that to disengage and allow to re-activate the stops 85, 86 for retaining the next reserve pallet stored on the upper rear trackway, until the active pallet handling section has undergone the described order picking and pallet emptying and discharging, and been again readied as described for flowing thereonto of a succeeding pallet.

I claim:

1. In a unitary gravity storage pallet platform,
a rear, reserve and empty pellet storing section comprising
an upper, forwardly inclined, reserve pallet receiving roller trackway, and
a lower, rearwardly inclined, empty pallet receiving roller trackway,
the planes of said upper and lower rear-section trackways non-intersecting within said frame; and
a front, active pallet storing section comprising
a platform-independent, active pallet receiving and discharging roller trackway, and
means for shifting said active pallet trackway, by simultaneous movement thereof in both translation and rotation, between an upper, full pallet receiving position of the same upper plane and forward inclination as said upper rear trackway, and a lower, empty pallet returning position of the same lower plane and rearward inclination as said lower rear trackway,
said upper and lower rear platform section trackways both non-extending to said front platform section whereby said shifting means is free to effect its said simultaneous movement shifting of said front section trackway between its said upper and lower, same-plane-and-inclination positions without interference with said rear section trackways.

2. The pallet platform of claim 1, and
normally active pallet stop means at the front end of said reserve pallet trackway.

3. In a gravity storage pallet platform, a rear, reserve and empty pallet storing section comprising
an upper, forwardly inclined, reserve pallet receiving roller trackway, and
a lower, rearwardly inclined, empty pallet receiving roller trackway,
said upper and lower trackways inclined only sufficiently for gravity forwarding and returning of their reserve and empty pallets,
said upper and lower trackways compactly vertically spaced only for clearance under the front end of the upper trackway of pallets lying flat on the lower trackway;
a front, active pallet storing section comprising
an active pallet receiving and discharging roller trackway,
means for shifting said active pallet trackway, by combinational movement thereof in both translation and rotation, between an upper, full pallet receiving position of the same plane and inclination as said upper rear trackway, and a lower, empty pallet returning position of the same plane and inclination as said lower rear trackway;
normally active pallet stop means at the front end of said reserve pallet trackway; and
active pallet trackway carried latch means operable to de-activate said pallet stop means upon the shifting of said active pallet trackway to its said upper position.

4. The pallet platform of claim 3, and
means actuated by gravity pallet forwarding on said active trackway for tripping said latch means to disengage and thereby re-activate said pallet stop means.

5. The pallet platform of claim 4, and
rear platform section associated means resetting said latch means, upon said shifting of said active pallet trackway to its said lower position, for again de-activating said stop means upon return shifting of said active pallet trackway to its said upper position.

6. The pallet platform of claim 5, and
means actuated by said resetting of said latch means for return thrusting of a pallet fully forward on said active pallet trackway.

7. In a gravity storage pallet platform,
a rear, reserve and empty pallet storing section comprising
an upper, forwardly inclined, reserve pallet receiving roller trackway, and
a lower, rearwardly inclined, empty pallet receiving roller trackway,
said upper and lower trackways inclined only sufficiently for gravity forwarding and returning of their reserve and empty pallets,
said upper and lower trackways compactly vertically spaced only for clearance under the front end of the upper trackway of pallets lying flat on the lower trackway;

a front, active pallet storing section comprising an active pallet receiving and discharging roller trackway, a shelf frame mounting said active pallet trackway, and means for shifting said active pallet trackway, by combinational movement thereof in both translation and rotation, between an upper, full pallet receiving position of the same plane and inclination as said upper rear trackway, and a lower, empty pallet returning position of the same plane and inclination as said lower rear trackway, said active pallet trackway shifting means comprising four point supporting, opposite side duplicated, front-rear differentiated toggle linkages hingedly connected to said platform and to said shelf frame.

8. The pallet platform of claim 7, wherein said toggle linkages are arranged to collapse in one mode to lower said shelf frame to said lower active pallet trackway position, and to fully extend to raise said shelf frame to a position above said upper active pallet trackway position, and order picker operable means for levering said toggle linkages in said one and the opposite mode, and pallet load withstanding means arranged to stop said levering means upon the collapsing thereby of said toggle linkages in said opposite mode to lower said shelf frame from said toggle fully extended position to said upper active pallet trackway position.

9. The pallet platform of claim 7, and guide means slidably engaging said shelf frame to said platform to restrict its said translation movement to vertical movement.

10. The pallet platform of claim 8, and spring means connected between said platform and said levering means to bias said toggle linkages from their said one mode collapsed position towards their full extended and other mode partially collapsed and stopped positions.

11. The pallet platform of claim 7, and means front-rear linking said opposite side toggle linkages whereby they shift in tandem, means for levering one of said toggle linkages, lever-follower linkage for tying the movement of the opposite of said toggle linkages to the movement of said one toggle linkage, and single handle means for push-pulling said levering means and thereby for unison shifting of all said toggle linkages.

12. The pallet platform of claim 7, wherein said front-rear linking means are hingedly connected to the center points of said toggle linkages.

13. The pallet platform of claim 7, and spacer means opposite-side-tying said toggle linkages.

14. The pallet platform of claim 12, and spacer means opposite-side-tying the center points of said toggle linkages.

15. The pallet platform of claim 11, wherein said lever-follower linkage comprises a torque rod or tube.

16. In a pallet handling apparatus, an integral apparatus frame;

a rear, reserve and empty pallet storing apparatus section comprising an upper, frame-mounted, reserve pallet gravity-forwarding trackway, and a lower, frame-mounted, empty pallet gravity-returning trackway, the planes of said upper and lower rear section trackways non-intersecting within said frame; and a front, active pallet handling section comprising an integral shelf frame within said integral apparatus frame, said shelf frame comprising opposite side members and front and rear transverse members;

a front pallet handling trackway carried on said shelf frame, said shelf frame and trackway mounted entirely independently of said integral apparatus frame and for simultaneous movement thereof in both translation and rotation; and means for positive shifting of said shelf frame and front trackway in said simultaneous movement and between a pallet forwarding position of alignment with said upper rear gravity-forwarding trackway and a pallet returning position of alignment with said lower rear gravity-returning trackway, said upper and lower rear apparatus section trackways both non-extending to said front apparatus section whereby said shifting means is free to effect its said simultaneous movement shifting of said front section trackway between said upper and lower, gravity-forwarding and gravity-returning alignment positions without interference with said rear section trackways.

17. The pallet handling apparatus of claim 16, wherein said reserve pallet trackway and said active pallet trackway in said forwarding position are inclined forwardly, and wherein said empty pallet trackway and said active pallet trackway in said returning position are inclined rearwardly, and normally active pallet stop means at the front of said reserve pallet trackway.

18. In a pallet handling apparatus, a frame;

a rear, upper, frame-mounted, forwardly inclined, reserve pallet gravity-forwarding trackway, a rear, lower, frame-mounted, rearwardly inclined, empty pallet gravity-returning trackway;

the planes of said upper and lower rear trackways non-intersecting within said frame;

a front, frame-independent, active pallet handling trackway;

means for positive shifting of said front trackway between a forwardly inclined, pallet forwarding position of alignment with said upper rear trackway and a rearwardly inclined, pallet returning position of alignment with said lower rear trackway;

normally active pallet stop means at the front of said reserve pallet trackway; and means, actuated by the shifting of said active pallet trackway to its said pallet forwarding position, for deactivating said stop means.

19. The pallet handling apparatus of claim 18 and means, actuated by the front forwarding of a pallet on said active pallet trackway, for tripping said deactivating means so as to release and thereby permit the re-activating of said pallet stop means.

20. The pallet handling apparatus of claim 18 wherein said pallet stop de-activating means is rear-carried on said active pallet trackway, and means, actuated by the front-forwarding of a pallet on said active pallet trackway, for disengaging said de-activating means from, and whereby to re-activate, said stop means, and means, actuated by the shifting of said active pallet trackway to its said pallet returning position, for re-positioning said de-activating means to re-engage said stop means upon the subsequent shifting of said active pallet trackway to its said pallet forwarding position.

21. In a pallet handling apparatus, a frame;

a rear, upper, frame-mounted, forwardly inclined, reserve pallet gravity-forwarding trackway;

a rear, lower, frame-mounted, rearwardly inclined, empty pallet gravity-returning trackway;

the planes of said upper and lower rear trackways non-intersecting within said frame;

a front, frame-independent, active pallet handling trackway; and means for positive shifting of said front trackway between a forwardly inclined, pallet forwarding position of alignment with said upper rear trackway and a rearwardly inclined, pallet returning position of alignment with said lower rear trackway, said active pallet trackway shifting means comprising four point supporting toggle linkages, said linkages front-rear differentiated such that the rear linkages extend higher in said forwarding position and are collapsed lower in said returning position of said active pallet trackway.

22. In a pallet handling apparatus, a frame;

a rear, upper, frame-mounted, reserve pallet gravity-forwarding trackway;

a rear, lower, frame-mounted, empty pallet gravity-returning trackway;

said reserve and empty pallet forwarding and returning rear trackways comprising fixedly mounted roller track;

the planes of said upper and lower rear trackways non-intersecting within said frame;

a front, frame-independent, active pallet handling trackway;

said active pallet handling trackway comprising a translation-rotation shiftable shelf frame, and roller track fixedly mounted on said shelf frame; and means for positive shifting of said front trackway between a pallet forwarding position of alignment with said upper rear trackway and a pallet returning position of alignment with said lower rear trackway.

23. The pallet handling apparatus of claim 21, wherein said toggle linkages have an intermediate, fully extended position, are fully collapsible in one mode from said intermediate position thereof to said returning position of said active pallet trackway, and are partially collapsible in the opposite mode from said intermediate position to said forwarding position of said active pallet trackway.

24. The pallet handling apparatus of claim 23, and means for stopping said opposite mode collapsing of said linkages at said forwarding position of said active pallet trackway.

25. The pallet handling apparatus of claim 23, and means for push-pull levering of said toggle linkages oppositely through said intermediate position to said fully and partially collapsed, pallet returning and forwarding positions.

26. The pallet handling apparatus of claim 25, and means, transversely and torsionally linking said toggle linkages whereby said levering means is one-hand-operable.

27. The pallet handling apparatus of claim 25, and spring means connected between said levering means and said frame to bias said active pallet trackway from said pallet returning position through said intermediate toggle linkage position to said pallet forwarding position.

* * * * *